United States Patent

Bridle et al.

[11] Patent Number: 6,163,680
[45] Date of Patent: Dec. 19, 2000

[54] TWO WAY RADIO COMMUNICATION SYSTEM AND METHOD FOR ESTABLISHING COMMUNICATION

[75] Inventors: Matthew Bridle; Antony John Wray, both of Basingstoke, United Kingdom; Rafael Carmon, Holon, Israel

[73] Assignee: Motorola, Inc., Schaumburg, Ill.

[21] Appl. No.: 09/098,905

[22] Filed: Jun. 17, 1998

[51] Int. Cl.[7] .................................................... H04Q 7/20
[52] U.S. Cl. .......................... 455/31.2; 455/509; 455/512; 455/514; 455/515
[58] Field of Search .................................... 455/509, 510, 455/511, 512, 513, 514, 515, 518, 527, 88, 63, 11.1

[56] References Cited

U.S. PATENT DOCUMENTS

| | | | |
|---|---|---|---|
| 5,778,320 | 7/1998 | Drozt et al. | 455/509 |
| 5,794,156 | 8/1998 | Alanara | 455/517 |
| 5,822,682 | 10/1998 | Schroderus et al. | 455/63 |
| 5,903,848 | 5/1999 | Takahashi | 455/512 |
| 5,907,794 | 5/1999 | Lehmusto et al. | 455/11.1 |
| 5,913,171 | 6/1999 | Solonel et al. | 455/502 |
| 5,966,642 | 10/1999 | Raffel | 455/455 |
| 6,099,331 | 12/1999 | Ueda | 455/450 |

*Primary Examiner*—Daniel S. Hunter
*Assistant Examiner*—Yemane Woldetatios
*Attorney, Agent, or Firm*—Susan L. Lukasik; Steven R. Santema

[57] ABSTRACT

A two way radio communication system (20) includes a plurality of radio units (22, 24, 26, 28, 30) communicating via at least one communication resource (34, 36). At least one first radio unit (22, 24, 26, 28, 30) of the plurality of radio units includes a receiver (48) for monitoring available resources of the at least one communication resource (34, 36) and a processor (46) for maintaining a prioritized list (45) of said available at least one communication resources and for selecting the highest priority available communication resource when the at least one radio unit (22, 24, 26, 28, 30) wishes to enter into communication with at least one second radio unit of the plurality of radio units. In this manner, an optimized communication resource is selected for the communication.

22 Claims, 4 Drawing Sheets

TWO WAY RADIO COMMUNICATION SYSTEM AND METHOD FOR ESTABLISHING COMMUNICATION

FIELD OF THE INVENTION

This invention relates to a self synchronised two way radio communication system. The invention is applicable to, but not limited to a method of establishing a radio link between at least two radio subscribers without using any control means.

BACKGROUND OF THE INVENTION

In a two way radio communication system there are often a number of communication resources, for example frequencies, time periods, coding schemes, that are available for allocating to communication system user's to enable the users to set up a communication link. In some communication systems, the radio users transmit and receive on the same radio frequency. In such a system, assuming no geographical reuse of the frequency, only one call can be established between at least two radio units at any one time. It is possible, and often implemented in multi-site systems, that the same communication resources are re-allocated on a geographical basis to some users as long as they do not interfere with existing users using that particular resource, for example where any potential interfering signal level from new users would be too low to be detected by the existing users.

In two-way radio communications systems, communications are typically performed via individual calls between two users or via group calls where users communicate to a number of other users in a particular communication group. A problem exists with the reuse strategy in the individual call scenario, as highlighted in FIG. 1. Portable radio unit 10 has entered into communication on a frequency resource with portable radio unit 12 and creating a coverage range for its transmissions of geographic area 14. Portable radio unit 16 is within that geographic area 14 and in close proximity to portable radio unit 10. Therefore, portable radio unit 16 receives a strong interfering signal from portable radio unit 10 on the frequency resource, whenever portable radio unit 10 transmits, such that it can not receive a communication from portable radio unit 18 on that resource. Portable radio unit 18 has no knowledge of the problems that exist for portable radio unit 16 on that frequency resource and may select that frequency resource as the chosen frequency for communicating with portable radio unit 16. As such a communication will not be completed.

The decision process for choosing a communication resource, in either a group call or individual call scenario, typically involves monitoring the resources available for communications, such as frequencies, and the calling radio selecting and establishing a call on a free resource, as seen by the calling radio. This situation does not arise in trunked communication systems where resources are allocated by a system controller, according to the current needs of users on the system, and the details of the chosen resource transmitted to the respective users via say, a signalling control channel or signalling time-slot.

A further difficulty arises when a radio unit wishes to communicate to a group of users, where the chosen communication resource may not be ideal or even available to all users. Each group may include a number of radio units using a common identification signal, with each radio unit monitoring the resources, waiting for their individual identification signal or group ID to be transmitted, in order to then participate in a subsequent call. Transmission of the common identification signal may occur via a polling technique, where all of the users in the desired group are polled as to the resources available at their particular location. In the digital short range radio (DSRR) standard the calling radio selects a frequency resource available at its location and transmits the details of this channel to the users the calling radio wishes to communicate with.

In a time division multiple access (TDMA) communication system time and frequency resources are allocated to users in trunked and/or non-trunked communications, for example where each frequency includes four time slots for use by four separate users. In non-trunked operation, i.e. direct mode operation (DMO) in the European TETRA standard, the radio units may communicate on a particular time slot dedicated for this mode of operation.

There are a number of disadvantages of the above described methods for the allocation of communication resources, primarily including the fact that the optimum resource for both the calling and called radio(s) is not necessarily selected.

This invention seeks to provide a two way communication system, a method of operating the two way communication system and a radio unit for use in the two-way communication system which mitigates at least some of the above mentioned disadvantages.

SUMMARY OF THE INVENTION

According to a first aspect of the invention there is provided a two way radio communication system. The two way radio communication system includes a plurality of radio units communicating via at least one communication resource. At least one first radio unit of the plurality of radio units comprises a receiver for monitoring available resources of the at least one communication resource and a processor for maintaining a prioritised list of said available at least one communication resources and for selecting the highest priority available communication resource when the at least one radio unit wishes to enter into communication with at least one second radio unit of the plurality of radio units. In this manner, an up-to-date list of optimum resources for communications is maintained at the at least one radio unit. The first and second radio units each further comprise a transmitter such that the first radio unit transmits the prioritised list to the second radio unit and the second radio unit receives the prioritised list, determines the preferred available at least one communication resource for communication between the first radio unit and the second radio unit and transmits the preferred available at least one communication resource to the first radio unit. In this manner, an optimised communication resource is selected by both the first and second radio units.

In the preferred embodiment of the invention, the first radio unit determines whether at least one communication resource is available by monitoring a signal strength of the at least one communication resource to determine the priority of said available at least one communication resource and also to calculate whether the signal strength exceeds a predetermined threshold signal level, thereby classifying the resource as available.

In an alternative embodiment of the first aspect of the present invention, the prioritised list of radio units, and indeed groups of radio units include primary (preferred) and secondary communication resources in which to initially attempt to instigate communications. In this manner, and advantageously, clashes of groups trying to access the same resource at any one time is reduced. To reduce the amount of monitoring performed by the first radio unit it is a feature of the alternative embodiment to monitor only these higher priority available communication resources. This results in the list containing a preferred communication resource, for example a preferred frequency, where other users are allocated alternative preferred resources in order to distribute the preferred resources throughout the whole communication resource and thereby, lessen the likelihood of clashes.

Preferably, the prioritised list of available communication resources is a binary sequence of all of the communication resources such that individual elements of the binary sequence are indicative of either the availability or non-availability of the communication resource. In this manner, only limited information about each communication resource needs to be transmitted in order for an optimised resource to be selected for the communication.

In the preferred embodiment of the invention, the first radio unit is also able to communicate with a first group of radio units from a plurality of groups. The plurality of groups may exceed the available communication resources within the communication system. Preferably, the first radio unit continues to transmit to the radio units in the first group of radio units, on the selected at least one communication resource for a predetermined hang up time after a communication terminates, thereby allowing the radio units within that group to maintain the radio connection link for further communications. In this manner, the use of that resource is kept available for radio units in the first group, should they so wish.

Preferably with group call communications, the first radio unit transmits a first signal indicative of the preferred at least one communication resource of the first radio unit to the first group of radio units to set up a call, the first group of radio units receive the signal and a third radio unit of the first group of radio units transmits a second signal indicating that the preferred signal is not acceptable to the third radio unit. The first radio unit and first group of radio units monitor the communication resources to receive a transmission of the second signal and select the preferred at least one communication resource when a second signal is not forthcoming.

In a second aspect of the present invention a radio transceiver for use in a two way radio communication system, as hereinbefore described, is provided.

In a third aspect of the present invention a method of operating a two way radio communication system, as hereinbefore described, is provided.

A preferred embodiment of the invention will now be described by way of example only, with reference to the drawing.

DETAILED DESCRIPTION OF THE DRAWINGS

Figure 1:
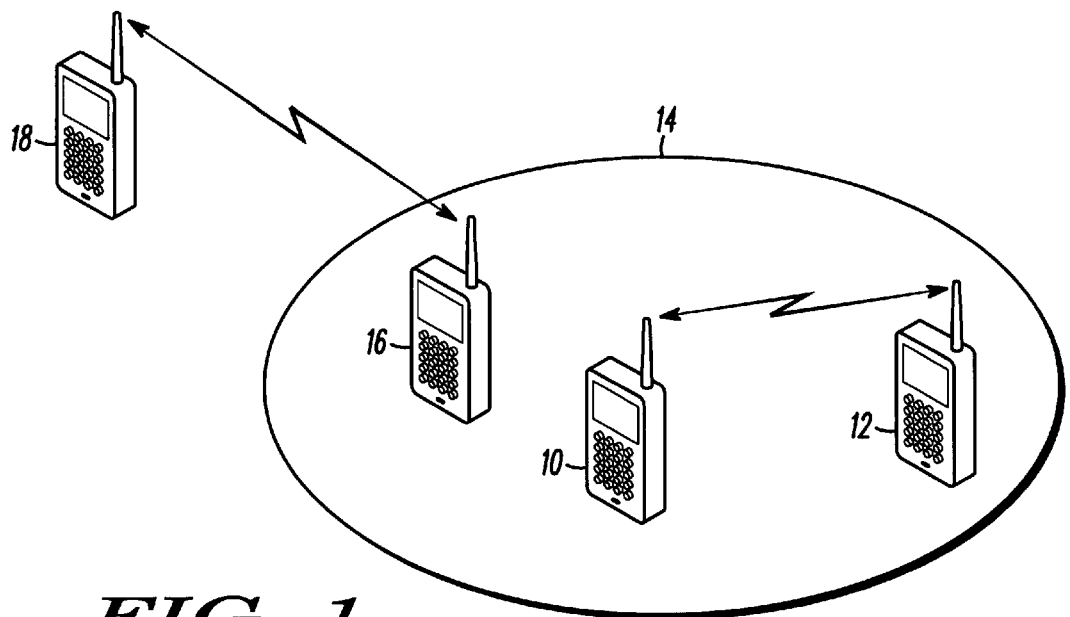
FIG. 1 shows a diagram highlighting a problem with selecting communication resources when setting up individual calls.
Figure 2:
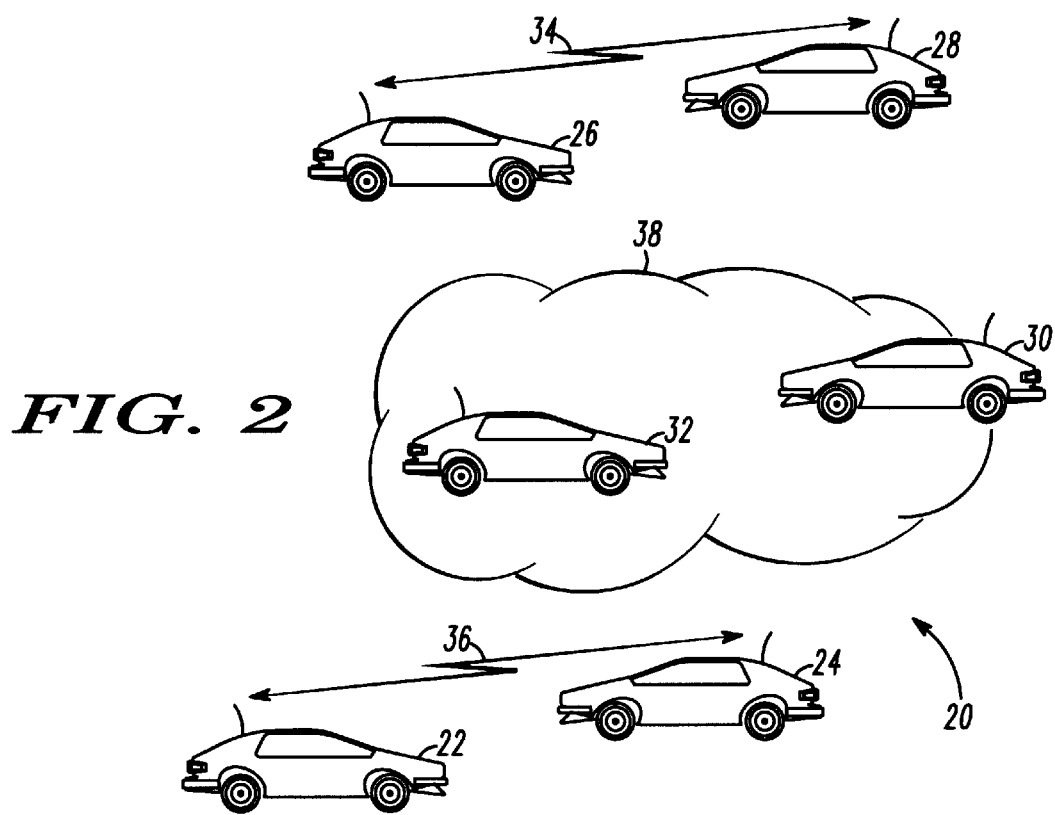
FIG. 2 shows a two way communication system according to a preferred embodiment of the invention.

Referring first to FIG. 2, a two way communication system 20 is shown that includes a plurality of radio transceivers, for example mobile stations 22, 24, 26, 28, 30 and 32. The mobile stations are preferably arranged in groups, for example mobile stations 22 and 24 are members of a first group, mobile stations 32 and 30 are members of a second group and mobile stations 26 and 28 are members of a third group. In the preferred embodiment of the invention, the two way communication system 20 has a plurality of communication resources including radio frequencies 34 and 36, each having respective time slots (not shown) arranged in a Time Division Multiple Access (TDMA) manner. It can be seen that there are more groups than available radio frequencies, thereby highlighting that there has to be some re-use between the groups of the available communication resource.

Figure 3:
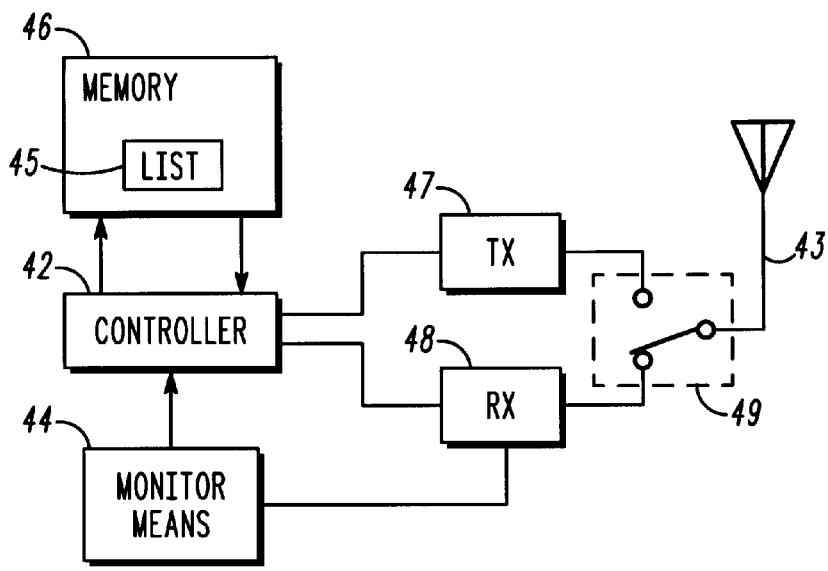
FIG. 3 shows a block diagram of a radio transceiver according to a preferred embodiment of the invention.

Referring now to FIG. 3, a block diagram of a mobile station 22, 24, 26, 28, 30 or 32 of FIG. 2 is shown. All mobile stations of the two-way communication system 20 simultaneously monitor the radio frequencies 34 and 36. Each mobile station includes monitoring means 44 for monitoring the activities on the radio frequency 34 or 36. An antenna 43 is connected to an antenna switch 49, for transferring received signals to a receiver block 48. A second position of the antenna switch 49 connects the antenna 43 to a transmitter block 47. The monitoring means 44 are connected to the receiver block 48 and to the controller 42. The controller 42, is connected to the transmitter block 47 and to a processor 46. The processor 46, which may include the function of the controller 42, contains a prioritised list of radio frequencies 45. In operation, radio stations of the same group have the same radio frequency list. Alternatively, if the first radio frequency is free for transmission then the mobile station can establish a call on the first radio frequency. If the radio frequency is occupied by a call of another group then all mobile stations of the same group will start to monitor the second radio frequency on the list, and so on. If the second radio frequency of the list is occupied then the radio will monitor the third frequency on the list. The radio will continue to monitor all the listed frequencies till the end of the list. The first frequency on the list is the preferred frequency and the process of establish a call starts by monitoring the first radio frequency on the list and if the first radio frequency is occupied, then establish a call on the first preceding free radio frequency.

Alternatively, it is possible for the called radio to select the best frequency for use in high interference situations, as described in UK Patent Application No. 9400880.2.

Figure 4:
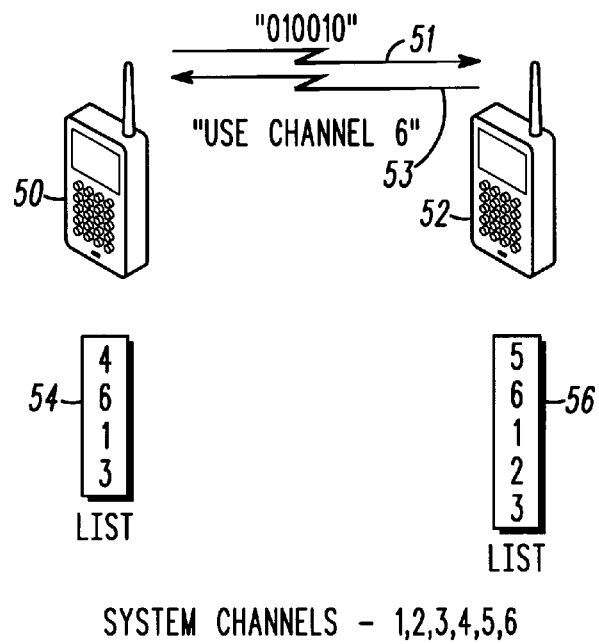
FIG. 4 shows a block diagram of an individual call set-up arrangement according to a preferred embodiment of the invention.

Referring now to FIG. 4, a block diagram of an individual call set-up according to a preferred embodiment of the invention is shown. Portable radio unit 50 wishes to communicate with portable radio unit 52. Portable radio unit 50 monitors the available frequency channels in its locality. When portable radio unit 50 wishes to select a communication it transmits a first message 51 to portable radio unit 52 that includes a status of available channels in its locality. The first message 51 is sent preferably in a binary format indicating the availability of each channel, with say, a "0" indicating the channel is free and a "1" indicating that that particular channel is busy. Portable radio unit 52 receives the request and deciphers the first message 51 to determine which of the channels are available to portable radio unit 50. Portable radio unit 52 is then able to assess which channels are also acceptable to itself. Portable radio unit 52 then transmits a second message 53 to portable radio unit 50 indicating the optimal channel for communications between portable radio unit 50 and portable radio unit 52 at that time. It is within the contemplation of the invention that other sequences, and not just a binary sequence, can be used.

An alternative embodiment includes portable radio unit 50 transmitting its prioritised (calling) list 54 to portable radio unit 52, based on say, received signal strength of traffic on each channel. Portable radio unit 52 receives the prioritised (calling) list 54 and compares the list with its own prioritised (called) list 56. Portable radio unit 52 then determines the optimal frequency channel at that time for communications between portable radio unit 50 and portable radio unit 52 and transmits the optimal channel information to portable radio unit 50, frequency channel "6" in the case shown.

Figure 5:
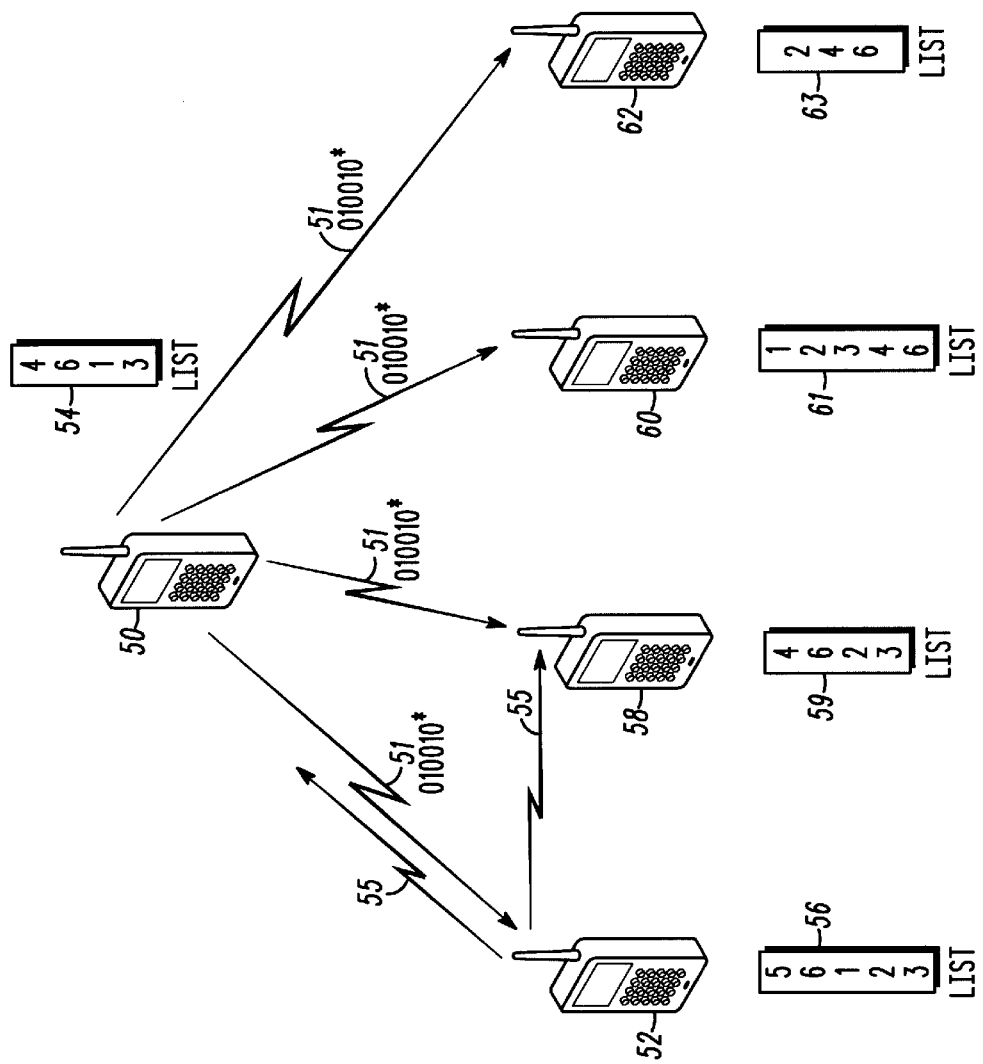
FIG. 5 shows a block diagram of a group call set-up arrangement according to a preferred embodiment of the invention.

Referring now to FIG. 5, a block diagram of a group call set-up according to a preferred embodiment of the invention, is shown. Portable radio unit 50 wishes to communicate with portable radio units 52, 58, 60 and 62 of a particular group. Portable radio unit 50 monitors the available frequency channels in its locality. When portable radio unit 50 wishes to select a communication it transmits a message that includes its preferred channel in its locality from its prioritised list 54. Portable radio units 52, 58, 60 and 62 receive the request for group call communication and decipher the message to determine if the selected channel is also acceptable to itself. If it is not acceptable, for example if channel "4" is selected by portable radio unit 50 which is not acceptable to portable radio unit 52, portable radio unit 52 then transmits, say a "NACK" message 55. The NACK message is received by all of the portable radio units 50, 58, 60 and 62, thereby indicating that channel 4 is unacceptable for the group call communication. In this situation portable radio unit 50 selects its next preferred option, channel "6", and transmits that channel to all members of the group. This channel is acceptable to all members of the group and when no NACK is monitored, all of the radio units in that group move to the selected channel "6" to commence the group call communication.

In an alternative embodiment of the present invention, portable radio units 52, 58, 60 and 62 receive the request for group call communication and each transmit their current prioritised list to portable radio unit 50. Portable radio unit 50 then selects the preferred communication channel, say channel "6", based on say, the numbers of radio units in the group that channel "6" is acceptable to or based on the user priorities.

Figure 6:
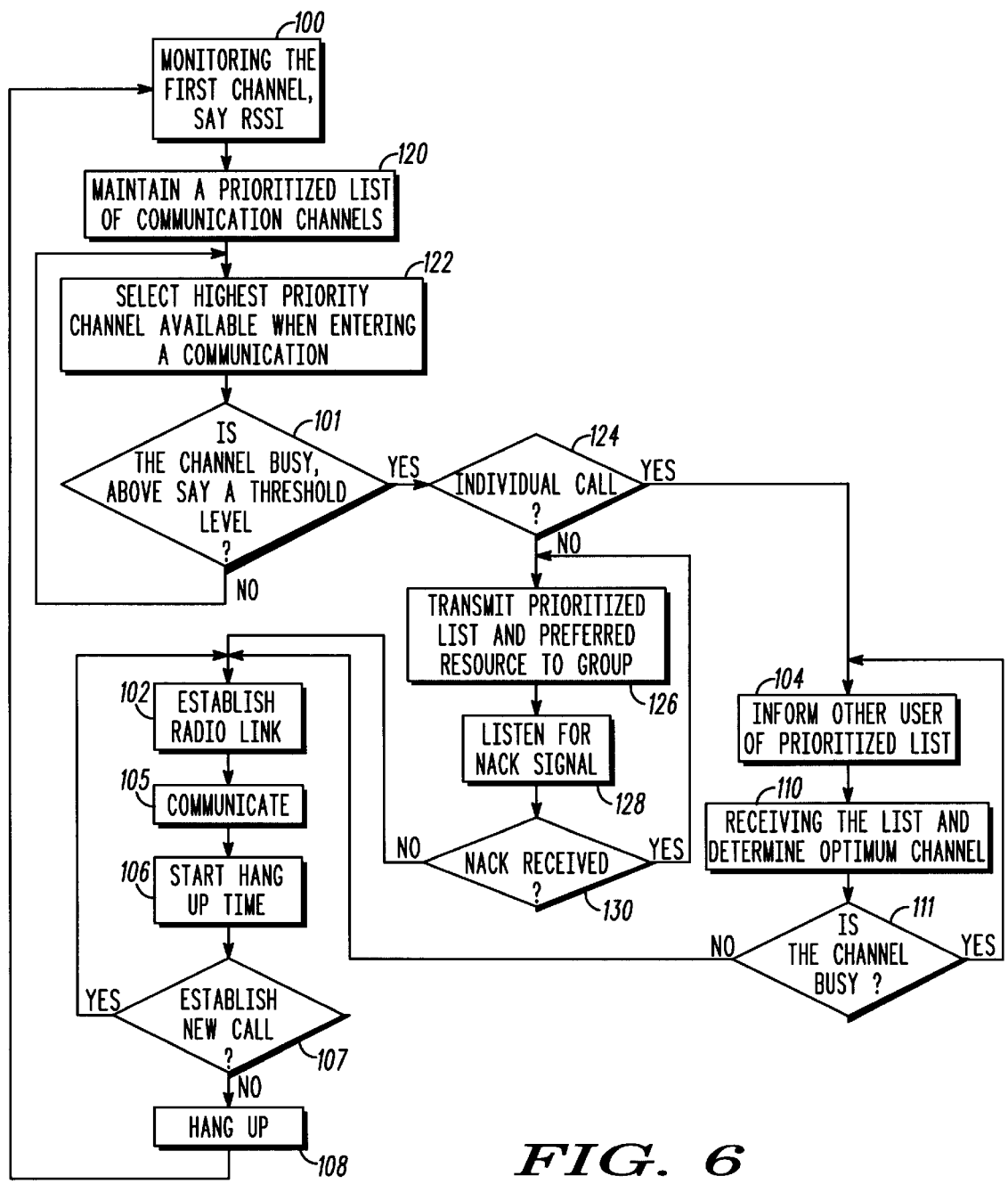
FIG. 6 is a flow chart showing a method of establishing a radio link according to a preferred embodiment of the invention.

The method for establishing a call will now be described with reference to FIG. 6. In the preferred embodiment, the communication system is a Time Division Multiple Access (TDMA) communication system, having a number of frequency channels, wherein each radio frequency is divided into four time-slots. All the radio stations monitor the available communication resources and determine their individual uses at their particular location by assessing the received signal strength of any signals received, as shown in step 100. Each radio unit maintains a prioritised list of the communications resources, as shown in step 120. If a first radio unit wishes to enter into a communication, with either a group or another radio unit, it selects the available resource with the highest priority from its list, as in step 122. The decision as to the availability of a resource is made, for example, by assessing whether the received signals are above a predetermined or variable threshold, as shown in step 101. If it is not above the threshold, the radio unit looks for another resource in step 122. If the channel is busy the preferred method can choose alternative ways of setting up a call dependent upon whether a group or an individual call is required, as in step 124. If an individual call is required, the radio unit transmits either its prioritised list or its preferred available resource to the second unit, as in step 104. The second unit receives the prioritised list or preferred resource and determines whether the communication link would be acceptable. If it is acceptable, a radio link is established as in step 102. If the chosen resource is not acceptable, its prioritised list is transmitted to the first radio unit and the process repeated, as shown in step 111 to 104. If a group call is required in step 124, the first radio unit transmits its prioritised list and preferred communication resource to all members of the group, as in step 126. All members of the group listen for a "NACK" signal, as in step 128. If no "NACK" signal is received from others groups then the radio units from the group go to the selected preferred resource and establish a communication link, as shown in step 102. If a "NACK" signal is received from any member of the group, the calling radio unit selects the next preferred resource from its prioritised list and all group members await a "NACK" signal for that resource, as shown in steps 130 to 126. This procedure continues until an acceptable resource is found. Once a radio link is established in step 102 and a communication performed in step 105, the first radio unit transmits a dummy message to occupy the channel for a predetermined time, which is defined as hang up time, as is shown in step 106. When members of the group attempt to establish a call during the hang up time, step 107, steps 102 to 107 will be repeated. If not, the first radio unit will hang up the call as is shown in step 108 and return to monitor the communication resources to form a prioritised list, as shown in step 100.

In this manner, a communication channel/resource is selected that is optimal for all radio users concerned in that particular communication. Hence, a two way communication system, a method of operating the two way communication system and a radio unit for use in the two-way communication system which mitigates at least some of the above mentioned disadvantages are provided.

We claim:

1. A two way radio communication system having a plurality of radio units communicating via at least one communication resource wherein at least one first radio unit of said plurality of radio units comprises;

a receiver for monitoring available resources of said at least one communication resource; and a processor for maintaining a prioritised list of said available at least one communication resources and for selecting a highest priority available communication resource when said at least one first radio unit wishes to enter into communication with at least one second radio unit of said plurality of radio units; and a transmitter to transmit said prioritised list to said at least one second radio unit wherein said at least one second radio unit receives said prioritised list, determines a preferred available at least one communication resource for communication between said at least one first radio unit and said at least one second radio unit and transmits information on said preferred available at least one communication resource to said at least one first radio unit.

2. A two way radio communication system according to claim 1 wherein the prioritised list of the first radio unit includes at least one predetermined preferred communication resource for attempting to enter into communication with at least one second radio unit of the plurality of radio units.

3. A two way radio communication system according to claim 1 wherein the first radio unit determines whether at least one communication resource is available by monitoring a signal strength of said at least one communication resource and calculating whether said signal strength exceeds a predetermined threshold signal level.

4. A two way radio communication system according to claim 3 wherein said signal strength monitoring of said at least one communication resource is used to determine the priority of said available at least one communication resource.

5. A two way radio communication system according to claim 1 wherein the first radio unit monitors only said higher priority available communication resources.

6. A two way radio communication system according to claim 1 wherein the list of available communication resource is a binary sequence of all of the communication resources such that individual elements of the binary sequence are indicative of either an available or non-available at least one communication resource.

7. A two way radio communication system according to claim 1, wherein the first radio unit communicates with a first group of radio units from a plurality of groups such that the plurality of groups exceeds the communication resources within the communication system and the first radio unit transmits the same information to the radio units assigned to the first group.

8. A two way radio communication system as claimed in claim 7 wherein the first radio unit continues to transmit to said second radio units on the selected at least one communication resource for a predetermined hang up time after a communication terminates to allow said second radio units within the same group to maintain the radio connection link for further communications.

9. A two way radio communication system as claimed in claim 7 wherein the first radio unit transmits a first signal indicative of the preferred at least one communication resource of the first radio unit to the first group of radio units to set up a call, the first group of radio units receive the signal and a third radio unit of the first group of radio units transmits a second signal indicating that the preferred signal is not acceptable to the third radio unit.

10. A two way radio communication system as claimed in claim 9 wherein the first radio unit and first group of radio units monitor the communication resources to receive a transmission of the second signal and select the preferred at least one communication resource when a second signal is not forthcoming.

11. A two way communication system as claimed in claim 1, wherein the at least one communication resource is frequency channel and the communication system is a Time Division Multiplex Access (TDMA) communication system operating in a direct mode of operation (DMO).

12. A radio transceiver for use in a two way radio communication system according to claim 1.

13. A method of operating a two way radio communication system having a plurality of radio units communicating via at least one communication resource the method comprising the steps of:

monitoring available resources of said at least one communication resource by a first radio unit;

maintaining a prioritised list of said available resources;

selecting a highest priority available communication resource when said first radio unit wishes to enter into communication with at least one second radio unit of said plurality of radio units;

transmitting said prioritised list from said first radio unit to said at least one second radio unit;

receiving said prioritised list at said at least one second radio unit;

determining a preferred available communication resource for communication between said first radio unit and said at least one second radio unit at said at least one second radio unit;

transmitting said preferred available communication resource from said at least one second radio unit to said first radio unit; and establishing a radio connection on a selected communication resource for communicating between said first radio unit and said at least one second radio unit.

14. A method of operating a two way radio communication system according to claim 13, further comprising the steps of:

determining whether at least one communication resource is available by monitoring a signal strength of said resource; and calculating whether said signal strength exceeds a predetermined threshold signal level.

15. A method of operating a two way radio communication system according to claim 14, wherein said signal strength monitoring of said communication resources is used to determine the priority of said available communication resources.

16. A method of operating a two way radio communication system according to claim 13, wherein the first radio unit monitors only said higher priority available communication resources.

17. A method of operating a two way radio communication system unit according to claim 13, wherein the list of available communication resource is a binary sequence of all of the communication resources such that individual elements of the binary sequence are indicative of either an available or non-available communication resource.

18. A method of operating a two way radio communication system unit according to claim 13, wherein the first radio unit communicates with a first group of radio units from a plurality of groups such that the plurality of groups exceeds the communication resources within the communication system, the method further comprising the step:

transmitting the same information from the first radio unit to the radio units assigned to the first group.

19. A method of operating a two way radio communication system unit according to claim 18 further comprising the step of:

continuing to transmit from the first radio unit to said second radio units on the selected at least one communication resource for a predetermined hang up time after a communication terminates thereby allowing said second radio units within the same group to maintain the radio connection link for further communications.

20. A method of operating a two way radio communication system unit according to claim 18 the method further comprising the step of:

transmitting a first signal indicative of the preferred at least one communication resource from the first radio unit of the first radio unit to the first group of radio units to set up a call;

receiving at the first group of radio units the first signal; and transmitting a second signal from a third radio unit of the first group of radio units such that the second signal indicates that the preferred signal is not acceptable to the third radio unit.

21. A method of operating a two way radio communication system unit according to claim 18 the method further comprising the steps of:

monitoring the communication resources by the first radio unit and first group of radio units; and selecting the preferred at least one communication resource when a second signal is not forthcoming.

22. A method of operating a two way radio communication system unit according to claim 13, wherein the at least one communication resource is frequency channel and the communication system is a Time Division Multiplex Access (TDMA) communication system operating in a direct mode of operation (DMO).

* * * * *